US005554240A

United States Patent [19]

Toy

[11] Patent Number: 5,554,240
[45] Date of Patent: Sep. 10, 1996

[54] THERMALLY CONDUCTIVE JOINING METHOD AND JOINT

[76] Inventor: William W. Toy, 511 Andros La., Indian Harbour Beach, Fla. 32937

[21] Appl. No.: 431,426

[22] Filed: May 1, 1995

[51] Int. Cl.$^6$ .................................................. B32B 31/02
[52] U.S. Cl. ........................ 156/83; 156/64; 156/304.1; 156/330; 156/381; 269/246; 269/287; 403/28; 403/29; 428/58; 428/416; 523/440
[58] Field of Search ............... 428/58, 416; 523/440; 403/28, 29; 156/83, 381, 304.1, 330, 64; 269/246, 287

[56] References Cited

U.S. PATENT DOCUMENTS

| 2,359,235 | 9/1944 | Miller | 269/246 |
| 2,951,778 | 9/1960 | Haberlin | 428/416 |
| 4,711,916 | 12/1987 | Hagiwara et al. | 523/440 |
| 5,011,872 | 4/1991 | Latham et al. | 523/440 |
| 5,205,895 | 4/1993 | Hohman et al. | 156/293 |

OTHER PUBLICATIONS

Brochure "Expoxies" Castall Inc. E. Weymouth MA 02189 1991/1992 Edition.

Primary Examiner—John J. Gallagher
Attorney, Agent, or Firm—Alvin S. Blum

[57] ABSTRACT

A method of joining metal parts together and the joints thereby produced having great strength and thermal conductivity by means of an adhesive filled with small, hard, thermally conductive particles. The filled adhesive is applied to the surfaces to be joined and the surfaces are pressed together with a force in the range of 35 to 105 Kg/sq cm while the adhesive is curing. A fixture is disclosed made of a metal with a coefficient of thermal expansion less than the parts being joined. When the parts are held in the fixture and heated, differential thermal expansion causes the fixture to apply the necessary pressure during curing while also providing a measure of the applied pressure. For joining a cooling fin normal to the surface of a part, a tapered plug is formed in the fin edge and it is forced into a tapered slot in the part after adhesive application. A low external perpendicular force applied to the fin yields a high pressure to the mating surfaces through the inclined plane. The external force may then be removed and the parts cured. The tapered plug and slots holds the pressure enough to ensure a strong thermally conductive joint.

8 Claims, 1 Drawing Sheet

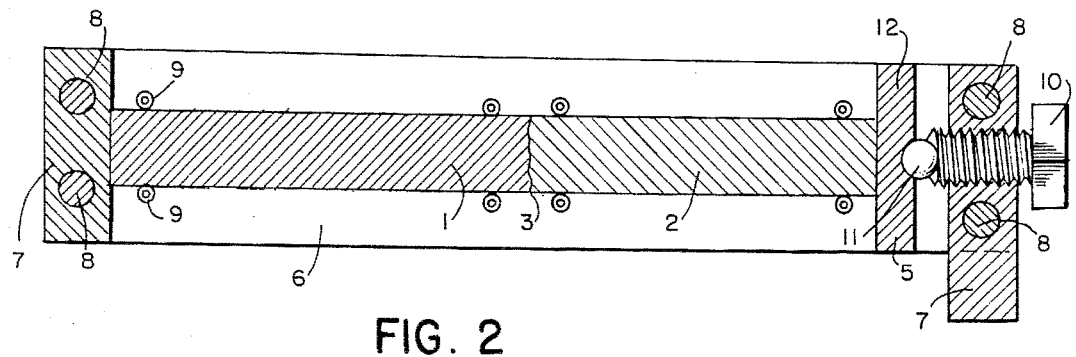
FIG. 2
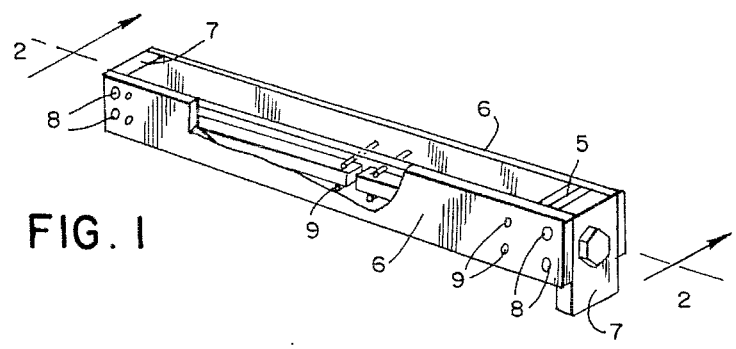
FIG. 1
FIG. 3
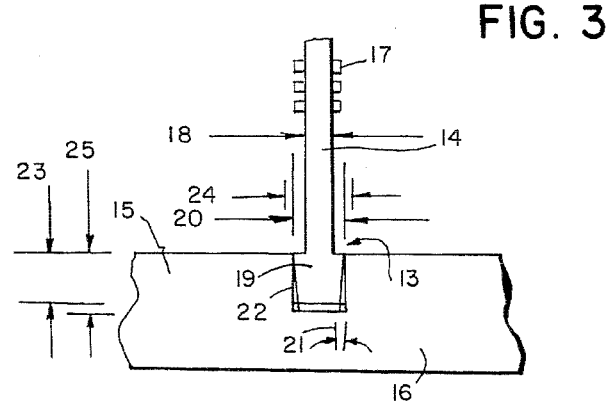

THERMALLY CONDUCTIVE JOINING METHOD AND JOINT

BACKGROUND OF THE INVENTION

This invention relates to joining metal members together, and more particularly to joining methods which employ adhesives and which provide enhanced thermal conductivity between the joined members.

When metal parts are to be joined together, spot welding or fasteners may produce a cheaper but weaker joint than brazing, soldering or adhesives. Brazing and soldering provide a strong joint with good heat transfer properties because the joint is occupied by thermally conductive metal. The fastener or spot welded joint provides poor thermal contact between the parts except at isolated points. Various thermally conductive adhesive formulations are available for metals, but their conductivity is so much less than the metals they are joining that the joint provides a serious barrier to the transfer of heat between metal parts thus joined. For example, a typical joint formed with a thermally conductive epoxy adhesive between aluminum parts is the thermal conductivity equivalent of a thickness of 8.9 millimeters of aluminum even though it is only a fraction of a millimeter thick. This is a joint formed with an alumina filled epoxy using the recomended 15 P.S.I. or 1.05 Kg/cm$^2$ clamping force. In the fabrication of many devices such as heat exchangers, such a serious impediment to heat transfer may prevent the use of adhesives. Consequently, brazing and soldering are preferred, even though they may be very costly to implement, being labor intensive and requiring special fixtures, and warping considerations.

SUMMARY OF THE INVENTION

It is accordingly an object of the invention to provide a joint between metal parts using adhesives in which the joint has negligible resistance to the transfer of heat between metal parts. It is another object that the method require little or no special fixtures. It is yet another object to provide an improved means of applying controlled pressure to the joint during the joining process, along with a quality assurance procedure.

The joining method of the invention comprises first the application of an adhesive filled with hard thermally conductive particles to the joint. The parts are then forced together, i.e. in a unidirectional manner, with a force of about 35–105 Kg/sq cm while the adhesive cures. This provides the thermally conductive, high strength joint required. A special fixturing method is provided for use in a heat curing oven to provide the necessary pressure when a butt joint is made. It closely encloses the part in a metal cage which does not expand as fast as the part when heated. All of the compressive forces are transmitted to the parts through a test ball forced against a softer metal test plate as the parts expand more than the cage. After the adhesive cures, the size of the indentation made by the ball in the test plate is measured to give a measure of the applied force for quality control purposes.

When a plate such as a cooling fin is to be joined normal to a planar surface, a tapered slot is formed in the surface and a tapered plug is formed in the fin. The filled adhesive is applied and the plug forced into the slot with a 1.5–4.55 Kg/linear cm force. The force may then be removed and the adhesive cured. The joint so formed will have great strength and such high thermal conductivity that any thermal resistance will be difficult to measure being generally less than that of 2 mm of aluminum.

The fin with plug and any striations or corrugations may be extruded from a very high conductivity, difficult-to-machine alloy because it requires no machining. Because this method of joining requires only momentary comparatively low pressing force, expensive fixtures to-maintain pressure during oven curing are unnecessary. Another advantage is that the full strength of the metal is undisturbed because it is not subjected to the high temperatures of welding and soldering, which also produce localized stress and distortion This joint method is low cost, fast, and produces a better joint.

These and other objects, advantages and features of the invention will become more apparent when the detailed description is considered in conjunction with the drawings.

BRIEF DESCRIPTION OF THE DRAWINGS

FIG. 1 is a perspective view of a fixture holding two bars being joined by the method of the invention.

FIG. 2 is a sectional view taken through line 2—2 of FIG. 1.

FIG. 3 is a sectional view of a cooling fin joined normal to a planar surface by the method of the invention.

DETAILED DESCRIPTION OF PREFERRED EMBODIMENTS

Referring now first to FIGS. 1 and 2, two aluminum bars 1, 2 are to be joined end to end in a butt joint 3. The two parts are first coated at the joint ends with an adhesive comprising a thermoset epoxy filled with alumina, aluminum oxide, $Al_2O_3$, in the form of tabular or plate-like alumina particles having a diameter of about 0.025 mm. The epoxy cures at 65° C. The bars are inserted into the steel jig or fixture 4 so that there is about 0.25 mm. clearance all around at ambient temperature. The jig 4 consists of two long side plates 6 bolted to end plates 7. Transverse pins 9 suspend the bars therebetween. In one end plate a large bolt 10 has a ball 11 at its tip. This is pressed against an aluminum test plate 12. When placed in an oven at 65° C., the aluminum expands more that the steel. The steel ball 11 is forced against test plate 12 and the bars 1 and 2 are forced against one another with a reproducible force. When properly configured and adjusted, a force of about 1000 P.S.I. or 70.29 Kg/sq cm has been found to be quite effective in producing a strong joint with very high thermal conductivity. The system is very reproducible. Built into the system is a very simple quality control. The steel ball indents the test plate 12, and the diameter of the indentation is proportional to the pressure exerted. In this way, the high pressure required during setting of the adhesive is reproducibly applied without elaborate apparatus and each joint made has a record of pressure applied during curing.

Referring now to the joint 13 shown in FIG. 3, a cooling fin 14 is joined normal to the surface 15 of a part 16. The fin has a thickness 18 of 1.6 mm and may have ribs 17 to enhance heat exchange. The edge of the fin is provided with a tapered plug 19, having an upper thickness 20 of 3.124 mm, a depth 23 of 3.05 mm, a draft angle 21 of two degrees. The fin is extruded from 6101 T6 aluminum alloy which is less machinable than 6061 T6 alloy but has 30% greater thermal conductivity, since no machining is required. A slot 22 is machined in the upper surface 15 of part 16 with an upper width 24 of 3.175 mm, a depth 25 of 3.175 and a draft angle of two degrees. The part 16 is of more easily machinable 6061 T6 aluminum. All of the sloping, wedge-shaped mating surfaces are coated with the above disclosed filled epoxy adhesive. The plug is then forced into the slot with a perpendicular force of 3.04 Kg/linear cm. The force is then removed and the joint cured at a temperature of 65° C. When a joint formed according to this method was tested, the fin did not pull out until a force of 80 Kg/linear cm had been applied.

The inclined plane action of the tapered plug and slot applies the high requisite surface to surface pressure, estimated to be 70 Kg/sq cm with only moderate applied external perpendicular force. Also a wedge with a draft angle of about 2° has been found to provide an effective joint even though the external force is removed before heating. Adhesives suitable for this application may include, but are not limited to, thermosets, epoxys, urethanes, acrylates, silicones, polyesters, and phenolics. Fillers may include, but are not limited to, refractory hard metals, carbides, beryllides, silicides, cermets, metal oxides and silicon arbides, and other thermally conductive particles having a thermal conductivity of at least about 0.034 gm cal/sec $cm^2 \cdot °C/cm$, hardness greater than that of the metals to be joined and of at least Rockwell B-100, and average diameters less than about 0.050 mm and preferably of between 0.010 and 0.050 mm.

The above disclosed invention has a number of particular features which should preferably be employed in combination although each is useful separately without departure from the scope of the invention. While I have shown and described the preferred embodiments of my invention, it will be understood that the invention may be embodied otherwise than as herein-specifically illustrated or described, and that certain changes in the form and arrangement of parts and the specific manner of practicing the invention may be made within the underlying idea or principles of the invention within the scope of the appended claims.

What is claimed is:

1. A method of joining metal surfaces of parts together to provide a high strength thermally conductive joint comprising the steps of:
   (A) applying an adhesive filled with particles having a particle size of less than about 0.050 millimeters, a hardness greater than that of the metals to be joined and having a thermal conductivity greater than that of said adhesive to at least one of said metal surfaces;
   (B) forcing said surfaces together with a surface pressure of at least about 35 Kg/sq cm by application of an external unidirectional force; and
   (C) curing the adhesive while the surfaces are held together with said force of at least about 35 Kg/sq cm, in which said adhesive is a thermoset adhesive and said force is applied during curing by an apparatus at least partially enclosing said parts, which apparatus expands less than said parts when heated to a temperature at which said adhesive cures, said force being applied by differential thermal expansion of said parts relative to said apparatus.

2. The method according to claim 1, in which said force is transmitted to said parts through a ball means applied to a planar member, said ball means being harder than said planar member so that said planar member is indented and the degree of indentation provides a measure of said force for quality control.

3. A method of joining metal surfaces of parts together to provide a high strength and high thermally conductive joint in which an edge of a first part is joined substantially normal to a face of a second part, comprising the steps of:
   (A) providing said edge with a wedge-shaped configuration having opposed sides which slope toward one another as said edge is approached;
   (B) providing said face with a wedge-shaped slot of a configuration that substantially corresponds to the configuration of said edge;
   (C) applying an adhesive filled with particles having a particle size of less than about 0.050 millimeters, a hardness greater than that of the metal surfaces to be joined, and having a thermal conductivity greater than that of said adhesive to at least one of said slot and said edge;
   (D) applying an external unidirectional force to force said edge into said slot so as to generate a surface pressure between the metal surfaces of said edge and said slot of at least 35 Kg/sq cm.;
   (E) removing the external force;
   (F) curing the adhesive after the external force has been removed.

4. The method according to claim 3 in which the curing is performed at a temperature elevated above ambient temperature.

5. The method according to claim 4 in which the surface pressure is at least about 70 Kg/sq cm.

6. A joint formed by the method of claim 4.

7. A joint formed by the method of claim 5.

8. The method of claim 3, in which said sides slope toward on another with a draft angle of about two degrees.

* * * * *